(12) United States Patent
Edens et al.

(10) Patent No.: US 7,648,721 B2
(45) Date of Patent: Jan. 19, 2010

(54) HYDROLYZED MILK PROTEINS

(75) Inventors: Luppo Edens, JL Rotterdam (NL);
Andre Leonardus De Roos, TB Delft (NL)

(73) Assignee: DSM IP Assets B.V., Heerlen (NL)

( * ) Notice: Subject to any disclaimer, the term of this patent is extended or adjusted under 35 U.S.C. 154(b) by 199 days.

(21) Appl. No.: 10/483,948

(22) PCT Filed: Jul. 18, 2002

(86) PCT No.: PCT/EP02/08072

§ 371 (c)(1),
(2), (4) Date: Jan. 14, 2004

(87) PCT Pub. No.: WO03/007730

PCT Pub. Date: Jan. 30, 2003

(65) Prior Publication Data

US 2005/0175622 A1     Aug. 11, 2005

(30) Foreign Application Priority Data

Jul. 18, 2001 (EP) .................... 01202749

(51) Int. Cl.
*A61K 39/00* (2006.01)
*A61K 39/38* (2006.01)

(52) U.S. Cl. .................. 426/34; 426/656; 424/184.1

(58) Field of Classification Search .................. None
See application file for complete search history.

(56) References Cited

U.S. PATENT DOCUMENTS

| | | | |
|---|---|---|---|
| 4,600,588 A | 7/1986 | Ernster | 426/42 |
| 5,405,756 A | 4/1995 | Naito et al. | 435/68.1 |
| 5,486,461 A | 1/1996 | Nielsen | 435/68.1 |
| 6,372,282 B1 | 4/2002 | Edens et al. | |
| 6,875,456 B2 | 4/2005 | Delest et al. | |
| 2004/0067279 A1 | 4/2004 | Delest et al. | |
| 2004/0115306 A1 | 6/2004 | Lopez et al. | |
| 2004/0241664 A1 | 12/2004 | Dekker et al. | |
| 2004/0241791 A1 | 12/2004 | Edens et al. | |
| 2005/0064403 A1 | 3/2005 | Edens et al. | |
| 2005/0175622 A1 | 8/2005 | Edens et al. | |
| 2005/0256057 A1 | 11/2005 | Edens et al. | |
| 2005/0271744 A1 | 12/2005 | Van Der Heyden et al. | |
| 2006/0257544 A1 | 11/2006 | Edens et al. | |
| 2007/0031399 A1 | 2/2007 | Edens et al. | |

FOREIGN PATENT DOCUMENTS

| | | |
|---|---|---|
| EP | 0223560 | 7/1992 |
| EP | 0384303 | 3/1993 |
| EP | 0601802 | 6/1994 |
| EP | 0631731 | 1/1995 |
| EP | 0610411 | 9/1996 |
| EP | 1062873 | 12/2000 |
| JP | 05017368 | 6/1993 |
| JP | 11243866 | 9/1999 |
| WO | WO 96/13174 | 5/1996 |
| WO | WO 02/45523 | 6/2002 |
| WO | WO 02/45524 | 6/2002 |

OTHER PUBLICATIONS

Sélo et al., Clinical and Experimental Allergy (1999) 29:1055-1063.
Dal Degan et al., Appl. Environ Microbial (1992) 58(7):2144-2152.
International Search Report for PCT/EP02/08072, mailed on Nov. 28, 2002, 3 pages.
Quéméneur et al., Nature (1998) 391:301-304.
Nielsen et al., Journal of Food Science (2001) 66(5):642-646.
Stoll et al., BBA (1976) 438:212-220.

*Primary Examiner*—Robert A Zeman
(74) *Attorney, Agent, or Firm*—Nixon & Vanderhye P.C.

(57) ABSTRACT

The present invention provides a composition comprising hydrolysed milk casein and, preferably non-hydrolysed whey protein in a ratio from 9:1 to 1:1 (on dry weight), which is a clear liquid at pH 4 when dissolved or present in water in an amount of 40 g/liter at 10° C.

14 Claims, No Drawings

HYDROLYZED MILK PROTEINS

CROSS-REFERENCE TO RELATED APPLICATION

This application is the national phase of PCT application PCT/EP02/08072 having an international filing date of 18 Jul. 2002, which claims priority from European application EP 01202749.6 filed 18 Jul. 2001. The contents of these documents are incorporated herein by reference.

FIELD OF THE INVENTION

The present invention relates to compositions comprising hydrolysed milk casein and preferably non-hydrolysed whey protein and in particular to novel processes for the production of hydrolysates comprising hydrolysed casein and preferably non-hydrolysed whey protein. As a result, such hydrolysates can be used in the manufacture of beverages such as sports drinks and soft drinks, dietetic products, infant nutrition or various food products or fermented products.

BACKGROUND OF THE INVENTION

The protein fraction of bovine milk is associated with health. The health promoting properties reside not only in the nutritional aspects of this protein fraction but also in the various health promoting factors present.

Milk proteins consists of approximately 80% caseins. The remaining protein is accounted for by a variety of whey proteins. The casein fraction is the main source of amino acids, calcium and phosphate all of which are required for growth of the young animal. The whey protein fraction is also a source of amino acids and in addition it contains several bioactive and putative health promoting proteins such as immunoglobulins, folate binding protein, lactoferrin, lactoperoxidase and lysozyme. It is also known that upon metabolisation of the casein and whey protein fractions a number of new bioactive peptides are formed. Examples of such newly formed bioactive peptides include casomorphins, casokinins, immunoglobulins, immunopeptides, caseinephosphopeptides, lactiphins and lactoferricin. Therefore, the use of casein and whey proteins in the combination in which they occur in milk offers significant nutritional and health benefits.

More recently industrially prepared hydrolysates of milk proteins were also found to contain newly formed bioactive peptides and notably ACE-inhibitors to fight hypertension.

The white appearance of milk is caused by the scattering of light by fat globules and casein micelles. Skimmed milk, i.e. milk from which all fat has been removed, is still white because of these casein micelles.

The whey protein fraction of the milk, i.e. milk after removal of both the fat and casein fraction, is a yellowish but clear protein solution which is rich in various proteins, peptides, lactose, minerals and vitamins. All of these constituents are completely soluble even under acidic conditions. Nevertheless the dissolution of whey proteins may yield turbid solutions as the result of partial denaturation during spray drying. Partial enzymatic hydrolysis can improve the dissolution characteristics of these somewhat denatured spray dried whey proteins. More exhaustive enzymatic hydrolysis of whey proteins further improves their solubility but also leads to modest increases in bitterness and levels of free amino acids present. The usual aim of more exhaustive enzymatic hydrolysis of whey proteins is to achieve a reduction in allergenicity and an improved intestinal uptake. Especially the reduced allergenicity aspect is commercially important. For example in different countries of Northern Europe cow's milk intolerance has been diagnosed in almost 3% of general populations of infants in the first two years of life. Beta-lactoglobulin belongs, together with the caseins to the major allergens in bovine milk. Adults rarely exhibit bovine milk allergies and specialised products for this group must be tailored to be easily assimilable, provide a good taste and exhibit good shelf stabilities, especially under acid conditions. It is therefore not surprising that there exists considerable literature regarding the exhaustive enzymatic digestion of whey hydrolysates aimed at clinical, dietetic and sports applications as well as infant nutrition.

In contrast with whey, casein is rich in hydrophobic amino acids so that its hydrolysates are notoriously bitter and tend to have rancid and brothy off-tastes. Due to their extreme bitterness enzymatically hydrolysed caseins find limited application only. Moreover their high content of hydrophobic amino acids make casein derived peptides difficult to dissolve, especially under acid conditions.

Processes for the preparation of partial casein hydrolysates described in the literature generally involve multi-step hydrolyses with a few endoproteases followed by incubation with one or more exoproteases. Combinations of various endoproteases are commonly used to obtain the high Degree of Hydrolysis (high DH) required to minimise possible allergenic reactions and to improve the solubility. Subsequent incubation with exoproteases releases amino-or carboxyterminal amino acid residues to minimise bitter off-tastes. However, the release of free amino acids implies losses in yield and a diminished nutritional value. Because high levels of free amino acids may also result in brothy off-tastes and increased osmotic values of the final hydrolysate, additional processing steps to remove free amino acids, and strongly hydrophobic peptides which account for the bitter off-tastes, are common practice.

Patent application EP 0 610 411 describes completely soluble casein hydrolysates of good organoleptic quality with low molecular weight peptides and a DH value in the order of magnitude of 15 to 35%.

Patent application WO 96/131744 describes a method for production of a milk protein hydrolysate characterised by a hydrolysis reaction involving any neutral or alkaline protease from *Bacillus* in combination with an *Aspergillus* enzyme complex comprising both endo-and exopeptidases and a degree of hydrolysis between 35% and 55%.

Patent application EP 384 303 describes a method for production of a protein hydrolysate exhibiting low bitterness and a low DH value using an aminopeptidase.

Patent application EP 223 560 describes a method for production of milk proteins by means of a sequential enzyme hydrolysis.

Patent application EP 0 631 731 describes a partial hydrolysate of a protein mixture comprising whey protein and casein wherein the hydrolysate has a degree of hydrolysis between 4 and 10% and a low bitter hydrolysate is obtained using a combination of trypsin and chymotrypsin.

Patent U.S. Pat. No. 4,600,588 describes a milk protein hydrolysate consisting of acid precipitated casein that has been treated with a.o. an acid fungal protease.

Patent application JP11243866 describes a casein hydrolysate useful for drinks and food which is tasteless and odorless and has a degree of hydrolysis of 17 to 30%.

SUMMARY OF THE INVENTION

The present invention provides a protein composition comprising hydrolysed casein protein and whey protein in a ratio of 9:1 to 1:1 dry weight. Preferably the whey protein is non-hydrolysed. The protein composition is a clear liquid at pH 4 when the hydrolysed casein protein and whey protein are dissolved or present in water in an amount of 40 g of protein (dry weight)/liter at 10° C.

In case the protein composition comprises less than 40 g of protein (dry weight)/liter, this composition is still a clear liquid at 10 degrees C. when concentrated to a liquid of 40 g of protein (dry weight)/liter.

The present invention also provides a method of production of a composition comprising casein protein and whey protein, wherein at least the casein fraction is hydrolysed.

The present invention also provides a product comprising a composition of the invention, for example a beverage such as a sports drink or a soft drink or a health drink or a dietetic food such as a product for elderly or for slimming people or an infant formula such as a term or follow-on product. Moreover it can be a fermented product or it can be incorporated into various personal care products.

DETAILED DESCRIPTION OF THE INVENTION

The product according to the invention preferably comprises whey protein and casein in a ratio as present in bovine milk. To take advantage of the bioactive peptides and proteins present, preferably enzymatic hydrolysis of the whey protein should be minimal. Enzymatic hydrolysis of the caseins should be far enough to guarantee a high protein yield in a clear product under acid conditions. Therefore the casein protein is hydrolysed by a sufficient amount of enzymes for a sufficient period of time to become an almost completely hydrolysed protein. Almost completely hydrolysed implies that only a few percent of the caseinate is not completely soluble and can cause some turbidity in the final hydrolysate. Similarly the whey fraction can contain some residual insoluble material such as traces of caseins. To remove this unsoluble matter from the mixture of casein hydrolysate and whey, either low speed centrifugation (for example at 2000-5000 g) or simple sedimentation followed by decantation provides industrially acceptable processing steps to obtain a clear product. It should be understood that regular cow milk cannot be clarified using either the low speed centrifugation or the sedimentation/decantation step. After mixing the hydrolysed casein proteins with whey proteins and preferably a low speed centrifugation, the resulting product yields a clear liquid at pH4 when dissolved or present in water in an amount of 40 g of protein (dry weight) per liter. In general hydrolysis takes place at pH from 3.5 to 9 and a temperature from 40 to 80° C. Preferably the protein hydrolysate has a whey to casein ratio as present in bovine milk, and is clear under acidic conditions. Preferably the hydrolysate has an improved neutral or bland taste and a good shelf stability.

A liquid composition is "clear" if at 10° C. and pH4 its optical absorption measured at 480 nanometer and using a 1 cm glass cell is below 1.00, preferably below 0.50, if measured against a supernatant of the same composition at 10° C. and pH4 that has been obtained after a centrifugation at 20,000 g for 20 minutes.

The present invention provides a mixture of milk protein hydrolysates, preferably casein hydrolysate and whey, in casein to whey ratios of 9:1 to 1:1 dry weight, preferably in a ratio as present in bovine milk. Moreover the present invention provides a method of production of such mixtures and nutritional beverages derived thereof. The protein hydrolysate can also be used in infant formulae, dietetic foods, nutraceuticals, ice creams, dressings, fermented products, yoghurts, and personal care products. In general the composition according to the invention has a strongly reduced allergenicity compared with bovine milk. In general the composition according to the invention has a bland or neutral taste and an improved solubility and transparency under acid conditions and can be used as basis for other beverages such as sport drinks or soft drinks or health drinks or fermented products. By the term bland taste is meant a bitterness level which is similar to or lower than a level of 15 mg/liter of kinine sulphate dissolved in distilled water and tasted at a temperature of 14° C.

To further improve the health benefits of the product of the present invention, the protein composition can be combined with vitamin concentrates, fruit or fruit fractions to lift the vitamin and fiber contents of the final product and even hydrolysate fractions to lift the level of bioactive peptides. Moreover the product of the invention can be fermented with a variety of microbial cultures to improve the taste, to improve the health benefits or to increase the viscosity of the final product. Ideally the fermentation is carried out simultaneously with the incubation of the proline specific endoprotease at a temperature between 40 and 50 degrees C. If the starter culture used generates a high viscosity, then the fermentation is best carried out after the low speed centrifugation step. Following inoculation with a suitable starter culture or a combination of various starter cultures, the whole mixture is fermented till the required acid pH is reached and then cooled down to 10-20 degrees C. The fermented base thus produced can be homogenized or diluted with water or juice, cooled to 4 degrees C. and filled into the required retail containers, i.e. with or without a pasteurisation or sterilisation step. To gain a broad consumer acceptance among consumers with non-medical needs, a high palatability as well as certain physico-chemical aspects such as solubility under acid conditions are of overriding importance. A clear and non-white appearance is an important plus as well as the absence of odours and aroma's such as diacetyl which are usually associated with dairy products. Therefore the present invention provides a method to produce a clear liquid under acidic conditions with low allergenicity compared to bovine milk and having the health promoting properties and nutritional effect of milk, which can be used in food applications such as beverages, including carbonated beverages, fermented products and food products.

The method of production of hydrolysates according to the invention may be carried out by using skimmed milk, skimmed milk powders, milk protein concentrates, mixtures of whey protein and casein in preferred ratios or isolated whey protein fractions and isolated casein fractions which are then mixed to obtain the preferred ratios, as starting materials or may be mixed after (part of) the fractions are hydrolysed or may be mixed during hydrolysis.

The whey proteins may be sourced from liquid whey obtained from cheese making, preferably a sweet whey such as that resulting from the coagulation of casein by an animal or microbial rennet which is further purified from contaminating caseins, for example by acidification followed by centrifugation. Preferably concentrated, non-spray dried versions of these whey products are used. Optionally commercially available whey protein powders may be used such as BiPRO (Davisco Foods International), PROXIME 660 or HIPROTAL 875 or DOMOVICTUS 535 (BDI, The Netherlands) or more preferably their non-spray dried equivalents. Optionally the whey used may have been subjected to non-proteolytic enzymes such as lactase to convert the lactose present into glucose and galactose. Optionally the whey material may have been demineralised.

The present invention preferably envisages none or only very limited hydrolysis of the whey protein fraction. Additionally, the present invention envisages a hydrolysate in which both the whey fraction and the casein fraction are hydrolysed as will occur during the hydrolysis of for example skim milk or skim milk powders. Skim milk is milk which is defatted and thus contains preferably less 1 g/liter of fat, preferably less than 0.8 g/liter of fat. In the product according to the invention using skim milk or skim milk powder as the starting material, the peptide fraction with a molecular weight below 1500 Daltons typically represents more than 85 wt % of the protein present in the composition of the invention whereas the peptide fraction below 5000 Daltons typically represents more than 95 wt % of the protein present in the composition of the invention. Therefore, the products according to the invention will preferably exhibit a markedly reduced allergenicity compared to the starting protein. The invention also envisages hydrolysates with lowered osmotic values such as can be obtained after nanofiltration, ion exchange or electro dialysis.

Transparency and acid solubility of the casein fraction can be obtained by enzymatically hydrolysing casein micelles to smaller peptides.

The casein source can either be rennet casein, acid casein or sodium, calcium or potassium case mate. For the process of this invention, the proteins are diluted or reconstituted in a solution containing from 10 to 150 gram protein per liter (1-15% w/w), preferably from 20 to 60 gram protein per liter.

To obtain partial hydrolysates, the proteins are first subjected to an endoprotease with a pH optimum between 4 and 10 and a preference for cleaving proteins at the carboxyterminal side of bulky, hydrophobic amino acid residues. Preferably the endoprotease is free of exoprotease.

Preferred endoproteases with such characteristics are subtilisin (EC3.4.24.4 or PESCALASE as supplied by DSM Food Specialities, Seclin, France or ALCALASE as supplied by NOVO, Bagsvaerd, Denmark), thermolysin (EC3.4.24.4 or THERMOASE as supplied by Daiwa Kasei, Osaka, Japan), neutral metallo protease (EC3.4.24.28 or BREWERS PROTEASE 2000 as supplied by DSM Food Specialities, Seclin, France or NEUTRASE as supplied by NOVO) or chymotrypsin (EC3.4.21.1). Another preferred endoprotease is a proline-specific endoprotease. A proline specific endoprotease can imply preferential cleavage at either the aminoterminal or the carboxyterminal side of proline. Endoproteases capable of cleaving at the aminoterminal side of proline are known (Nature, Vol 391,15 January 15, pp 301-304, 1998). Endoproteases with a preference for cleaving at the carboxyterminal side of proline are also known (EC3.4.21.26). The latter type of proline-specific endoprotease is preferably obtained from food-grade overproducing recombinant strains such as *Aspergillus*. An example of a suitable producer of this enzyme has been described in co-pending patent EP-application number PCT/EP01/14480. As this proline-specific endoprotease can only hydrolyse peptide bonds involving proline residues, this enzyme can advantageously be combined with one of the preferred endoproteases to hydrolyse the combined whey protein and casein or the isolated fractions. An important advantage of using a proline specific endoprotease is that it is capable of cleaving major allergenic epitopes in both caseins and whey proteins. For example, casein is very rich in proline residues and thus can be frequently cut by the proline specific endoprotease. The three major allergenic epitopes of beta-lactoglobuline (fragments 41-60, 102-124 and 149-162; Clinical and Experimental Allergy, 1999, Vol 29, pp 1055-1063) all contain a central proline residue so that incubation with the endoprotease is likely to reduce recognition by the relevant human IgE's hereby minimising the allergenicity of the final product. A preferred embodiment of the process according to the invention is that the casein fraction or both the whey fraction and the casein fraction are subjected to hydrolysis involving at least a proline-specific endoprotease.

Another preferred embodiment of the process according to the invention is that the enzymatic hydrolysis of the whey fraction, the casein fraction or the protein fraction, as present in whole milk, is hydrolysed with the use of endoproteases only i.e. without the use of any exoproteases.

Depending on the pH optimum of the proline-specific endoprotease, the hydrolysis can be carried out in combination with or separate from the other endoprotease. The hydrolysis can be carried out under constant pH or uncontrolled pH conditions. Preferably the hydrolysis is carried out in two steps, firstly the proteins are incubated under neutral or alkaline conditions with an endoprotease with a preference for cleaving proteins at the carboxyterminal side of bulky, hydrophobic amino acid residues. During this hydrolysis the pH drops to acidic values (i.e. below pH 7) and only then the second endoprotease is added, preferably a proline-specific endoprotease, more preferably a proline specific endoprotease obtained from *Aspergillus*.

The quantity of enzyme required to achieve the desired degree of hydrolysis depends upon the enzyme used. However, the enzyme dosage and incubation conditions are optimised in such a way so that the majority of the casein protein fraction is dissolved in the aqueous phase of the reaction after incubation periods of typically 6 to 20 hours. By majority is meant that under pH 4, less than 20%, preferably less than 10%, more preferably less than 5% of the protein present in the casein fraction can be precipitated upon centrifugation for 10 minutes at 2000 g.

An additional debittering of the hydrolysate resulting from the incubation with the endoproteases may be beneficial. Additional debittering is preferably carried out by simultaneous or subsequent incubation with an exoprotease preparation which is prefrably free from endoproteolytic activity. Where the incubation is carried out subsequent to the incubation with the endoprotease, pH adjustment with hydrochloric acid may be necessary; inactivation of the endoprotease is usually not required. Debittering can also be carried out under neutral or slightly acidic conditions with a suitable aminopeptidase which exhibits a preference for removing aminoterminal hydrophobic amino acid residues such as for example Accellerzyme (DSM Food Specialities; Delft, The Netherlands) or Corrolase LAP (Röhm, Darmstadt, Germany) or APII from *Bacillus stearothermofilus* and isolated as described by Stoll et al (BBA 438(1976) 212-220). Alternatively debittering can be carried out under slightly acidic conditions with a suitable carboxypeptidase which exhibits a preference for removing carboxyterminal hydrophobic amino acid residues such as CPDI (PepG) from *Aspergillus* (Dal Degan et al, Appl. Environ Microbial, 58(7)2144-2152). Optionally a combination of the two types of exoproteases can be used under slightly acidic conditions. Preferred incubation temperatures for the endoproteases as well as the exoproteases are 40° C. or higher, preferably 50° C. to 80° C.

Irrespective of the conditions of the hydrolysis, the final hydrolysate preferably is subjected to an additional step of enzyme inactivation. The enzyme inactivation step can be an heat treatment which comprises heating to a temperature of at least 85° C. for at least 10 minutes. If higher temperatures or more extreme pH values are used, shorter periods may be feasible. Such heat treatment is preferably carried out at an acidic pH value, preferably between 3 and 7. To remove any non solubilised material from the final product, decantation or low speed centrifugation at for example 2000-4000 g as can be carried out at industrial scale is preferred. Optionally the hydrolysate can be filtered using an ultrafilter, a microfilter, diatomaceous earth, fiberglass filters or using cross-flow filtration. Complete enzyme inactivation can be confirmed by a dye-gelatin test. Optionally the filtered final hydrolysate can be treated with activated charcoal or with nanofiltration, ion exchange or electro dialysis to remove a surplus of salts. The filtered hydrolysate can be pasteurised or sterilised and, if required, further concentrated by drying techniques such as evaporation, nano filtration, spray drying, fluidized bed drying or combinations thereof. Preferably the obtained product is in granular form.

Advantageously the ratio of casein and whey protein is substantially present as bovine milk. The whey protein is preferably non-hydrolysed protein.

Advantageously casein or whey protein or a combination of the two are hydrolysed using endoproteases only i.e. without the use of an exoprotease.

Preferably the final protein mixture comprises from 10 to 50% whey protein and from 90 to 50% casein. More preferably the protein mixture comprises from 20 to 40% whey protein and from 80 to 60% casein. Percentages of casein and whey protein are both expressed on a dry weight basis.

In a preferred embodiment of the invention caseinate is hydrolysed with a preferred endoprotease and then subjected to incubation with a proline specific endoprotease. As such or preferably after centrifugation, the casein hydrolysate is concentrated and dried. The dried product can be redissoved in non-hydrolysed whey to obtain the desired protein concentration and protein ratio and then, if required, centrifuged or filtered and pasteurised or sterilised to obtain the product according to the invention. Alternatively the concentrated casein hydrolysate is mixed with concentrated, non-hydrolysed whey protein to reach the desired protein concentration and protein ratio and then optionally centrifuged or filtered and optionally pasteurised or sterilised to obtain the product according to the invention.

Obviously the product can be subjected to additional enzyme treatments such as lactases or fermented with different types of starter cultures or combined with all kinds of ingredients such as fruit concentrates, flavours, colorants, alcohol, carbon dioxide, thickeners, acidulants, antioxidants, herbs or herb extracts, health promoting compounds like vitamins or provitamins or bioactive peptides or carbohydrates or amino acids to formulate a product which is in line with the marketing needs.

In the final application in which the pH value is in general higher than 3, preferably higher than 3.5 and the total protein concentration is less than 5% w/w, preferably less than 3.5% w/w, the optical absorption of the solution (comprising 40 g/l protein) as measured at a wavelength of 480 nm is less than 1.000, preferably less than 0.50 as measured against the supernatant of the solution, that has been obtained after a centrifugation at 20,000 g for 20 minutes, using a 1 cm glass cell at 10° C. and pH4.

EXAMPLE 1

Hydrolysis of Casein Using Proline Specific Endoprotease

The incubation of 1 gram of thermolysin per kg of a. sodium caseinate powder, in a solution/suspension containing 60 grams of sodium caseinate (MIPRODAN 30 as supplied by MD Foods, Viby, Denmark) per liter at pH 6.7 and 75° C. under constant pH conditions after 3 hours resulted in a clarified solution, with almost no precipitate. After adjustment of the pH to 5.0, the enzyme was inactivated at 95° C. for 45 minutes. The liquid was cooled and tasted giving a very bitter taste. The pH was adjusted to 6.0 and 3 units of proline specific endoprotease from *A. niger* were added to 25 ml of this caseinate hydrolysate. One activity unit of proline specific endoprotease from *A. niger* is defined as the amount of enzyme required to liberate 1 μmol of pNA per minute from N-carbobenzoxy-glycine-proline-p NitroAnilide (z-Gly-Pro-pNA) (Bachem, Switzerland) at pH 5 and 37° C. The liberation of pNA is measured by optical absorption at 410 nm. After incubation at 50° C. overnight, the pH was again adjusted to 5.0 and another enzyme inactivation step (30 minutes at 90° C.) was carried out. After cooling to room temperature, the caseinate hydrolysate was completely dissolved and clear.

Tasting demonstrated the absence of any bitterness.

HPLC using an ion trap mass spectrometer (Thermoquest, Breda, the Netherlands) coupled to a P4000 pump (Thermoquest, Breda, the Netherlands) was used in characterising the molecular weight distribution of the casein peptides as produced by the enzyme incubation. The peptides formed were separated using a PEPMAP C18 300A (MIC-15-03-C18-PM, LC Packings, Amsterdam, The Netherlands) column in combination with a gradient of 0.1% formic acid in MILLI Q water (Millipore, Bedford, Mass., USA; Solution A) and 0.1% formic acid in acetonitrile (Solution B) for elution. The gradient started at 100% of Solution A and increased to 70% of solution B in 45 minutes and was kept at the latter ratio for another 5 minutes. The injection volume of 50 μl was used, the flow rate was 50 μl per minute and the column temperature was maintained at 30° C. The protein concentration of the injected sample was approx. 50 μg/ml. According to the data obtained, most of the casein peptides had molecular weights ranging from 300 to 1200 D.

EXAMPLE 2

A clear, non bitter milk-like drink obtained by mixing extensively hydrolysed caseinate with non-hydrolysed sweet whey.

To 200 mL of a solution of sodium caseinate (MIPRODAN 30 supplied by MD Foods, Viby, Danmark), containing 60 grams per liter, 300 mg of THERMOASE (a heat stable metallo-endoprotease from *Bacillus thermoproteolyticus Rokko* with an activity of 14,000 PU/mg as produced by Daiwa Kasei, Osaka, Japan) was added. During incubation at pH 6.7 and 75° C. immediate flocculation and precipitation of caseinaceous protein occurred. Further incubation for three hours under constant pH conditions resulted in a clarified solution, with almost no precipitate. The pH of the solution was adjusted to pH 5.0 and the THERMOASE inactivated by heating for 45 min at 95° C. After cooling, the solution was tasted and found to be very bitter.

After pH adjustment to pH 6.0, 3 units of proline specific endoprotease (as measured using Z-Gly-Pro-pNA at pH 5 and 37° C.) from *A. niger* was added to 25 ml of the hydrolysate. After incubation for 20 hours at 50° C., another enzyme inactivation cycle was carried out by heating the solution for 30 minutes at 90° C. After cooling to room temperature and adjustment of the pH value to 4.0, the caseinate hydrolysate was found to be completely dissolved and clear i.e. showing an optical absorption of 0.24 as determined spectrophotometrically at 480 nm in a 1 cm cell agaist water. Tasting demonstrated the absence of any bitterness or off-flavors.

Mixing of this twice concentrated casein solution with the same quantity of fresh, double concentrated sweet whey that had been freed from contaminating casein protein by acidification to pH 4.0 followed by low speed centrifugation, finally yielded a clear, non-bitter milk-like drink.

EXAMPLE 3

A clear, non-bitter solution of hydrolysed whey proteins obtained by hydrolysis of sweet whey.

Sweet whey was made free from caseinaceous protein by acidification of the solution to pH 4. After centrifugation the clear superatant was decanted. The pH of the whey fraction was adjusted to pH 6.8. To 200 ml of this solution 200 mg of THERMOASE (a heat stable metallo-endoprotease from *Bacillus thermoproteolyticus Rokko* with an activity of 14,000 PU/mg as produced by Daiwa Kasei, Osaka, Japan) was added. During incubation at pH 6.7 and 75° C. slight flocculation and precipitation of protein occurred. Further incubation for three hours under constant pH conditions resulted in a clarified solution, still containing some precipitate. The pH of the solution was adjusted to pH 5.0 and the THERMOASE inactivated by heating for 45 min at 95° C.

After cooling down, the solution was tasted and observed to be slightly bitter.

After another pH adjustment to pH 6.0, 3 units of proline specific endo-protease (as measured using Z-Gly-Pro-pNA at pH 5 and 37 degrees C.) from *A. niger* was added to 25 ml of the hydrolysate. After incubation for 20 hours at 50° C., another enzyme inactivation cycle was carried out by heating the solution for 30 minutes at 90° C. After cooling to room temperature and adjustment of the pH value to 4.0, the whey protein hydrolysate was found to be completely dissolved and clear i.e. showing an optical absorption of 0.35 as determined spectrophotometrically at 480 nm in a 1 cm cell against water. Tasting demonstrated the absence of any bitterness or off-flavors.

EXAMPLE 4

A clear, non bitter, milk protein based solution obtained by hydrolysis of skim milk without the use of exoproteases.

To 200 mL of a commercially available skim milk 300 mg of THERMOASE (a heat stable metallo-endoprotease from *Bacillus thermoproteolyticus Rokko* with an activity of 14,000 PU/mg as produced by Daiwa Kasei, Osaka, Japan) was added. During incubation at pH 6.7 and 75° C. immediate flocculation and precipitation of protein occurred. Further incubation for three hours under pH stat conditions resulted in a clarified solution, almost without precipitate. The pH of the solution was adjusted to pH 5.0 and the THERMOASE was inactivated by heating for 45 min at 95° C. After cooling down, the solution was tasted and observed to be very bitter.

After another pH adjustment to pH 6.0, 3 units of proline specific endoprotease (as measured using Z-Gly-Pro-pNA at pH 5 and 37 degrees C.) from *A. niger* was added to 25 milliliters of the hydrolysate. After incubation for 20 hours at 50° C., another enzyme inactivation cycle was carried out by heating the solution for 30 minutes at 90° C. After cooling to room temperature and adjustment of the pH value to 4.0, the caseinate hydrolysate was found to be completely dissolved and clear i.e. showing an optical absorption of less than 0.900 as determined spectrophotometrically at 480 nm in a 1 cm cell against water. Tasting demonstrated the absence of any bitterness or off-flavors.

EXAMPLE 5

A clear, acid stable, non bitter liquid with a milk-like composition obtained by mixing hydrolysed sodium caseinate with various non-hydrolysed whey preparations.

The pH of a 6% (wt) solution of sodium caseinate (90% protein as obtained from DMV International, The Netherlands) was adjusted to 8.0 after which 40 microliter of DELVOLASE (Delvolase®, 560,000 DU per gram as obtained from DSM Food Secialities, Seclin, France) was added per gram of casein. Then the mixture was incubated at 60 degrees C. with constant stirring for either 150 or 210 minutes at a pH which was either non-controlled or held constant at 8.0. After incubation, the hydrolysis reaction was stopped by lowering the pH to 5.0 using lactic acid followed by a heat shock of 10 minutes at 90 degrees C. Then the temperature was lowered to 50 degrees C. and proline specific endoprotease from *A. niger* (see WO 02/45523) was added. Per gram of casein 250 microliter of an enzyme solution containing 8 units per milliliter (i.e. 2 units/gram caseinate, measured as described in Example 1) was added and incubated for either 240, 480 or 960 minutes. Finally an additional heat shock of 10 minutes at 95 degrees C. was applied after which all samples were diluted with distilled water to reach a caseinate concentration of 3%, cooled down to 14 degrees C. and then offered to a specialised tasting panel trained in quantifying bitter off-tastes in dairy products. After tasting, all members of the panel agreed that all samples obtained from the various DELVOLASE incubations and their subsequent 480 or 960 minutes incubation with the proline specific endoprotease were non-bitter. Samples obtained after incubation with just DELVOLASE were considered to be extremely bitter, samples obtained with DELVOLASE and a 240 minutes incubation with proline specific endoprotease were rated as slightly bitter.

The degree of hydrolysis using the OPA method as described by Nielsen, P. M. et al (Journal of Food Science, Vol 66, No 5, PP 642-646, 2001) as measured after the incubations with Delvolase were about 12%; after incubation with the proline specific endoprotease the DH values increased to values between 16 and 20%.

To prepare a product with a composition which is essentially the same as bovine milk, the various double concentrated (i.e. 6 grams/liter) non-bitter caseine hydrolysates as produced using the above mentioned protocols were mixed with an equal volume of double concentrated (i.e. 1.3 grams/liter), non-hydrolysed whey proteins. At first different whey protein solutions were prepared using commercial and non-commercial products. Among the various whey products tested, BiPRO (Davisco Foods International), PROXIME 660 or HIPROTAL 875 or DOMOVICTUS 535 (BDI, The Netherlands) all yielded relatively clear and bland tasting products. Fresh cheese whey yielded a yellowish turbid product with a strong dairy aroma. Among the combinations made with these different whey products and the different caseine hydrolysates, especially the combination with a non-pasteurised (non-commercial) version of PROXIM 660 proved to be particularly interesting because of its attractive taste and lack of turbidity or off-odours.

Despite the fact that the milk-like mixtures thus prepared were quite transparent, low speed centrifugation of 10 minutes at 2000 g or simple sedimentation for a few hours followed by decantation resulted in completely clear products.

The centrifuged products typically resulted in optical absorption below 0.90 as determined spectrophotometrically at 480 nm in a 1 cm cell against water. Most importantly the latter processing steps resulted in protein losses which were typically less than 10% of the fraction dissolved. The clear solutions thus prepared also remained clear even upon acidification to pH to values as low as 4.0 and 2.8.

EXAMPLE 6

A simplified hydrolysis protocol to convert skim milk into a clear, bland tasting and acid stable end product.

Commercially available skim milk (Friesche Vlag, The Netherlands) with a concentration of 39 grams/liter of proteins, 51 grams/liter of carbohydrate, 0.5 grams/liter of fat and a final pH of 6.5 was equilibrated in a waterbath at 60 degrees C. after which 40 microliter of DELVOLASE (see Example 5) was added per gram of casein (the skim milk used contains 30 grams casein/liter). The mixture was incubated with constant stirring without pH adjustments. After 150 minutes of incubation, the pH was lowered to 5.0 using lactic acid and the solution was split into two portions. One portion was heated for 10 minutes to 90 degrees C. to inactivate the subtilisin whereas the other portion was kept at 60 degrees C. for an additional 10 minutes.

Then both portions were transferred to a waterbath of 50 degrees C. and after equilibration proline specific endoprotease was added to the two vials to reach concentrations of 250 microliter of enzyme (i.e. 2 units; see Example 5) per gram of casein present. After an additional incubation period of 960 minutes at 50 degrees C., both portions were subjected to a heat shock of 10 minutes at 95 degrees C.

Then the DH values were determined using the protocol as outlined in Example 5. After the DELVOLASE incubation, the DH was 20%. After incubation with the proline specific endoprotease the sample subjected to a heat shock to inactivate the DELVOLASE had a DH value of 26% whereas the other sample showed a DH of 30%. Tasting of the two final solutions was again carried out at 14 degrees C. and by the same trained panel as mentioned in Example 5. According to the conclusion of the tasting panel, both solutions were equally non-bitter.

Again, low speed centrifugation of the two preparations yielded clear solutions that remained clear upon further acidification to pH 4. Peptide size analysis was carried out by chromatography over a SUPERDEX PEPTIDE HR 1030 column. The data obtained showed that in the material prepared with Delvolase inactivation, the fraction containing peptides smaller than 1500 Daltons represented 94 wt % of the protein present in the solution whereas the fraction containing peptides smaller than 5000 Daltons represented 99 wt % of the protein present in the solution. In the material prepared without inactivation of the DELVOLASE, the fraction containing peptides smaller than 1500 Daltons represented 87 wt % and the fraction containing peptides smaller than 5000 Daltons also represented 99 wt % of all proteins present.

In conclusion the results shown in the present Example demonstrate that skim milk as well as caseines can be effectively hydrolysed to non-bitter, clear hydrolysates using a simplified hydrolysis protocol. The very large proportion of small peptides present suggests a strongly reduced allergenicity of the resulting skim milk hydrolysate in comparison with regular skim milk.

The invention claimed is:

1. A composition comprising hydrolysed casein protein and whey protein in a ratio of from 9:1 to 1:1 dry weight, which is a clear liquid at pH 4 when dissolved or present in water in an amount of 40 g/liter at 10° C.

2. The composition of claim 1 wherein the whey protein fraction is non-hydrolysed.

3. The composition of claim 1 having a reduced allergenicity compared to the protein composition before hydrolysis.

4. The composition of claim 1, wherein the fraction of the hydrolysed protein that has a molecular weight below 5000 Dalton is more than 90% by wt of the protein present in the hydrolysed protein.

5. The composition of claim 4 wherein the fraction of hydrolysed protein that has molecular weight below 5,000 Daltons is more than 95% by weight of the protein present in the hydrolysed protein.

6. The composition of claim 1, wherein the fraction of the hydrolysed protein that has a molecular weight below 1500 Dalton is more than 80% by wt of the protein present in the hydrolysed protein.

7. The composition of claim 6 wherein the fraction of hydrolysed protein that has molecular weight below 1,500 Daltons is more than 85% by weight of the protein present in the hydrolysed protein.

8. The composition of claim 1, wherein skim milk is used as source of the casein and whey proteins.

9. The composition of claim 1, which contains from 10 to 150 of total protein dry weight per 1000 g of the composition.

10. The composition of claim 1, which contains less than 10% w/w of water.

11. A foodstuff comprising a composition according to claim 1.

12. The foodstuff of claim 11 which is a sports drink or a soft drink or a health drink.

13. The composition of claim 1, which has further been fermented with one or more microbial starter cultures.

14. The composition of claim 13, which is homogenized or diluted with water or juice.

* * * * *